US012762001B1

(12) United States Patent

Jain et al.

(10) Patent No.: US 12,762,001 B1

(45) Date of Patent: Oct. 13, 2026

(54) SYSTEM AND METHOD FOR CONTROLLED FAULT INJECTION AND VALIDATION IN DISTRIBUTED SYSTEMS

(71) Applicant: Amazon Technologies, Inc., Seattle, WA (US)

(72) Inventors: Dhiraj Kumar Jain, Bandel (IN); Vijayasarathy Kannan, Chennai (IN); Naveen Kumar Shukla, Kanpur (IN); Li-Che Hsiao, Seattle, WA (US); Raman Mittal, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 83 days.

(21) Appl. No.: 18/824,523

(22) Filed: Sep. 4, 2024

(51) Int. Cl.
*G06F 11/26* (2006.01)
*G06F 11/07* (2006.01)

(52) U.S. Cl.
CPC ........ *G06F 11/079* (2013.01); *G06F 11/0766* (2013.01); *G06F 11/26* (2013.01); *G06F 11/261* (2013.01)

(58) Field of Classification Search
CPC ....... G06F 11/079; G06F 11/26; G06F 11/261
See application file for complete search history.

(56) References Cited

U.S. PATENT DOCUMENTS

| | | | | |
|---|---|---|---|---|
| 7,536,605 | B2 * | 5/2009 | Keaffaber | G06F 11/3688 717/124 |
| 7,802,147 | B1 * | 9/2010 | Johnson | G06F 11/263 714/41 |
| 8,225,143 | B2 * | 7/2012 | Bates | H04L 41/0663 714/41 |
| 9,824,000 | B1 * | 11/2017 | Babcock | G06F 11/3688 |
| 10,986,013 | B1 * | 4/2021 | Theimer | H04L 41/0604 |
| 11,397,665 | B2 * | 7/2022 | Singh | G06F 11/3698 |
| 12,259,799 | B1 * | 3/2025 | Hornsby | G06F 11/263 |
| 12,271,281 | B2 * | 4/2025 | Marrotte | G06F 11/324 |
| 12,277,049 | B2 * | 4/2025 | Nagar | G06F 11/0709 |
| 12,625,795 | B1 * | 5/2026 | Hornsby | G06F 11/3688 |
| 2003/0172321 | A1 * | 9/2003 | Wolin | G06F 11/2215 714/41 |
| 2008/0215925 | A1 * | 9/2008 | Degenaro | G06F 11/263 714/41 |
| 2009/0248381 | A1 * | 10/2009 | Liu | G06F 11/3688 703/13 |
| 2012/0284690 | A1 * | 11/2012 | Blakeley | G06F 8/60 717/120 |
| 2015/0193319 | A1 * | 7/2015 | Southern | G06F 11/2242 714/41 |

(Continued)

*Primary Examiner* — Jonathan D Gibson

(74) *Attorney, Agent, or Firm* — Knobbe, Martens, Olson & Bear, LLP

(57) ABSTRACT

The present disclosure generally relates to systems and methods for a controlled fault injection and validation framework used to test the availability and resiliency of a distributed system. Specifically, some embodiments of the present disclosure relate to receiving a request for a failure injection, creating a failure configuration based on the requested failure injection, scanning for pending failures in the database, injecting pending failures into a target service with an agent, scheduling validation tasks mapped to the failure injection, running validation tasks, and updating the result of the validation tasks in the database.

20 Claims, 6 Drawing Sheets

(56) References Cited

U.S. PATENT DOCUMENTS

| | | | | |
|---|---|---|---|---|
| 2015/0378859 | A1* | 12/2015 | Jang | G06F 11/263 714/41 |
| 2018/0060202 | A1* | 3/2018 | Papak | G06F 11/3409 |
| 2018/0288091 | A1* | 10/2018 | Doron | H04L 63/0227 |
| 2020/0409810 | A1* | 12/2020 | Wu | G06F 11/2257 |
| 2023/0409418 | A1* | 12/2023 | Sood | G06F 11/2273 |
| 2024/0176726 | A1* | 5/2024 | Lemberg | G06F 11/0793 |
| 2025/0036546 | A1* | 1/2025 | Anderson | G06F 11/3608 |
| 2025/0053501 | A1* | 2/2025 | Ayyadurai | G06N 3/0475 |
| 2025/0217270 | A1* | 7/2025 | Singh | G06F 11/3688 |
| 2025/0377959 | A1* | 12/2025 | Popat | G06F 11/008 |

* cited by examiner

SYSTEM AND METHOD FOR CONTROLLED FAULT INJECTION AND VALIDATION IN DISTRIBUTED SYSTEMS

BACKGROUND

A distributed computing system is a computer network of multiple computing devices with multiple software components running as a single system. In this way, a computer network can operate as a powerful single computer with access to large-scale resources in order to solve complex problems. Like individual computers, distributed systems may experience various failures. Testing and validating the availability and resiliency of a distributed computing system in the event of such failures is an important part of maintenance of the system.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
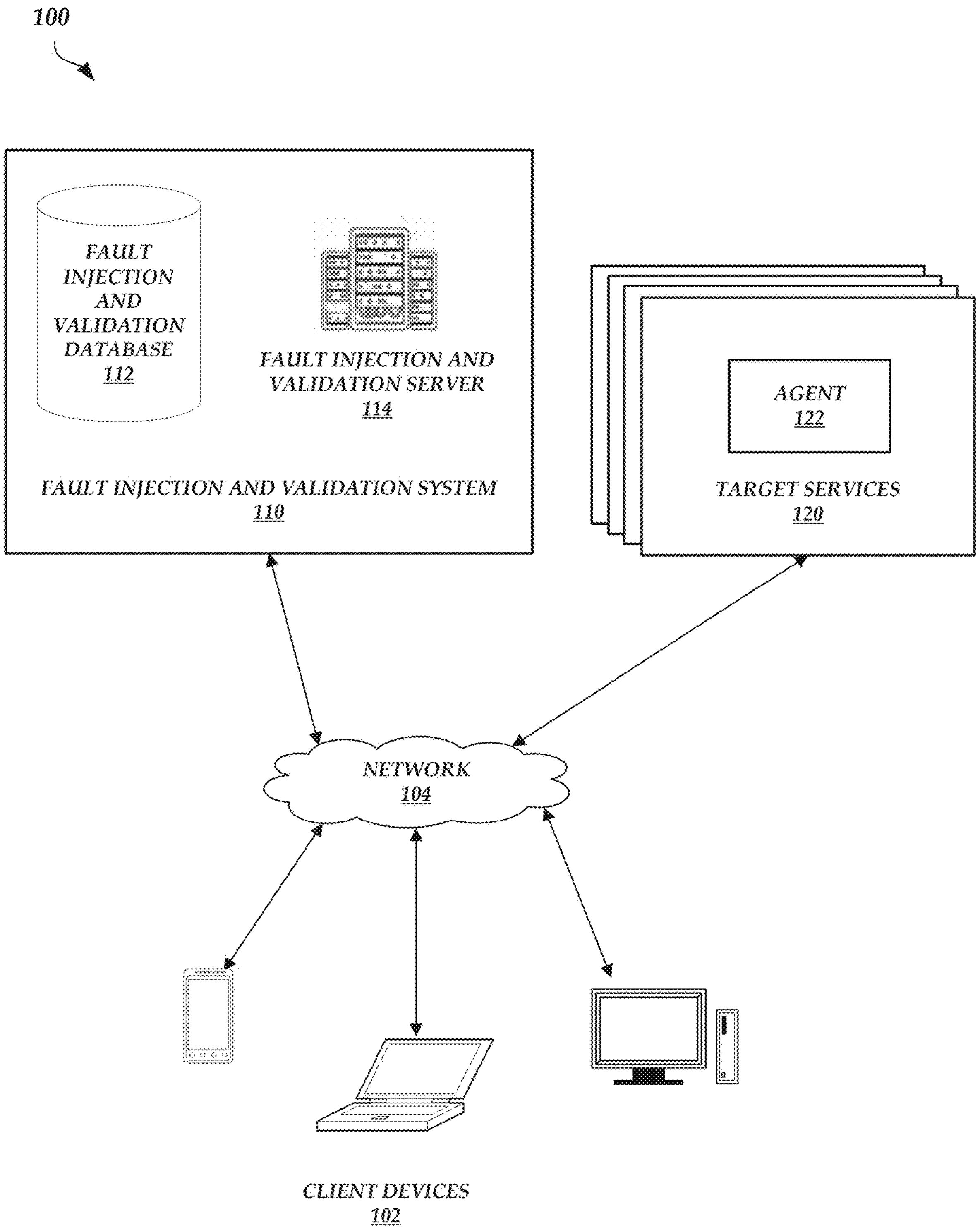
FIG. 1 depicts an illustrative computing environment in which embodiments of the present disclosure can be implemented by a controlled fault injection and validation framework to test the availability and resiliency of a distributed system.

Generally, aspects of the present disclosure relate to providing a controlled fault injection and validation framework (hereafter "CFIV framework") that conducts hands-off testing of the resiliency of a distributed system during simulated failures. Using an automated CFIV framework, unanticipated failures of the distributed system can be mimicked in a test environment mirroring production. When the CFIV framework exposes availability or resiliency shortcomings in a distributed system, these shortcomings can be addressed in the test environment before having the chance to disrupt the production environment. In this way, implementation of a CFIV framework in a test environment of a distributed system reduces (or even eliminates altogether) instances of actual unanticipated failures in the production environment. For example, a large-scale distributed computing system may be compromised due to various factors such as latency across availability zones, data center power outages, fire incidents, or other natural disasters (despite mitigating solutions such as redundancy or quorum protocols). Such risks make it important to introduce controlled failures (called "failure injections") into the distributed system and verify any assumptions or hypotheses posed regarding the distributed system's availability and resiliency during a hypothetical failure event. Running an experiment to test these hypotheses requires manual effort to orchestrate failures and validate the distributed system during a failure injection. But such manual effort cannot capture the random and unanticipated nature of many types of failures experienced by distributed systems.

To capture the full range of such failures and mimic the randomness of true failure events, an automated chaos testing framework is able to systematically and routinely conduct large-scale stress tests across the distributed system. Notably, the automated chaos testing of the CFIV framework automates not only the failure injections, but also the validations of the distributed system that follow the failure injections (e.g., to gather data about the performance of the distributed system during the failure injection). To automate failure injections and validations, the CFIV framework comprises CFIV agents that reside on some or all instances of the distributed system and a CFIV service responsible for handling failure injections and validations. Further, the CFIV service may serve as a gateway to the capabilities of the CFIV framework for external clients. Notably, CFIV agents are generic in nature and can be installed on any kind of stateless/stateful distributed systems. Further, CFIV agents are not limited to storage systems. The CFIV framework can be used to test systems, such as cloud provider networks and premise-based systems.

Introduction

Distributed computing systems are often built at large scales in order to facilitate sufficient computing capacity for challenges such as processing massive volumes of data (e.g., data modeling, image analysis, real-time simulations, etc.) as well as solving many other complex issues for large organizations that may require extensive computing power. For distributed systems operating at scale, it is critical to incorporate redundancy measures for the applications and data being housed within the distributed system in order to ensure consistent reliability and availability for all users of the distributed system. For example, redundancy measures may include distributing the computing resources across geographic availability zones or maintaining multiple backups or copies of resources and data in the system. While such redundancy measures may help a distributed system weather the storm of an unexpected system outage, failure, or natural disaster without extensive data loss, redundancy measures do not address the underlying threat of such unexpected failures themselves. Rather than preparing the distributed system for the next outage (or better yet, preventing the next outage), redundancy measures simply attempt to mitigate the fallout of the next outage.

For this reason, preparing for and preventing failure events within distributed systems necessitates a framework that can simulate the randomness of real-life failure events at scale. Moreover, such a framework needs the ability to operate with accuracy and efficiency. The automated chaos testing of the CFIV framework removes the inaccuracies and inefficiencies of the manual configuration of chaos testing, and further, the CFIV framework uses randomization algorithms that intentionally create unexpected combinations of outages across the distributed system. In this way, experiments that are designed to simulate real-life surprises are not bound by the imaginations of the engineers designing the specific failure event. Instead, failure injections of the CFIV framework are hands-off and may be run on periodic cadences or schedulers. Further, a client can access the CFIV framework to request specific, custom failures as desired, either as one-time experiments or regularly scheduled failure testing.

The CFIV framework not only automatically injects failures into a distributed system at random, but the CFIV framework also maintains a custom 1: N mapping between a failure and the failure's corresponding validations. For example, if the CFIV framework injected a failure into a distributed system to increase central processing unit ("CPU") stress, the CFIV framework may retain a mapping for the CPU stress failure that contains validations of application programming interface ("API") latency and the accuracy of the API calls involved. The client can customize validation mappings as desired, and the CFIV framework can receive and store input regarding the logic for the validations needed to correspond to a given failure.

Traditional solutions for chaos engineering and stress testing of distributed systems require extensive manual coordination—the engineers involved decide which machines within the system to incorporate in a simulated outage and how to specifically simulate an outage in each given machine. Furthermore, traditional solutions require meticulous manual coordination of validations after a failure injection. For example, if a test engineer manually simulates an outage of a set of virtual machines, she may then have to write down the virtual machines involved, note the timestamp, and run another tool to conduct a validation. Such approaches are problematic because they give rise to "false alarms"-situations in which the system may generate alerts that are not relevant to the injection or validation at hand. Inundating a testing environment with false alarms thwarts the underlying objective behind having a testing environment: if test engineers are manually sorting through system alarms and acclimating to the regular occurrence of false alarms, the entire testing process becomes highly vulnerable to human error. It becomes very easy to misclassify a true alarm as a false alarm, or in the alternative, to waste time chasing down a false alarm only to realize the alarm was benign.

The CFIV framework provides a technical solution to the above problems, among others, by introducing an improvement on existing technology for chaos engineering and stress testing of distributed systems. Namely, the CFIV framework automates a regular cadence of randomized and customized failure injections for a distributed system (as well as allowing for individual requests for custom failure injections and experiments outside of the regular cadence). Furthermore, the CFIV framework overcomes the key hurdle of the manual validation process (and its corresponding false alarms) required by traditional solutions. The CFIV framework stores and maintains custom mappings for each individual failure, tying each failure to the desired validations for that failure. What is more, the CFIV framework automates the validation process, automatically beginning mapped validations as soon as a failure injection is completed successfully.

This seamless and automated flow from failure injection to validations not only increases efficiency, but also allows a design that circumvents the false alarms and human error involved in a manual validation process. The CFIV framework includes agents located on every micro-service that may receive a failure injection. The agent itself contains the custom logic received from the client through a server of the CFIV framework, and when a failure injection is requested (e.g., by a client using a Representational State Transfer "REST" API or by any integration test framework running continuous tests), the server stores a configuration file in a database for the requested failure injection. Later, when running the failure injection, the server uses the failure configuration file in its call to the agent, which houses the logic for each available failure and injects the failure into the micro-service. Upon successful completion of the failure injection, the server makes another call to the agent to run the corresponding validations before storing the results of the test in the database for client viewing. In this way, a client may stay consistently aware of outstanding resiliency and availability issues that arise within the distributed system and take proactive steps to address issues that arose in a simulated stress test before allowing the issues to pass into the production environment. Not only does this proactive approach allow for preparation and prevention of real life failure events (and the data loss and availability compromises that such events lead to), but the approach also harnesses the power of the automated, randomized, regularly scheduled CFIV framework to provide the most accurate mirror to unanticipated, random, real-life failure events.

The generic structure of the CFIV framework provides additional improvement over traditional solutions. The CFIV framework is cloud-agnostic and accommodates premise-based systems. The agents of the CFIV framework are generic as well and can be installed on any stateless/stateful distributed system (e.g., not limited to storage). In some embodiments, the CFIV framework is a Java-based service installed on virtual machines as well as container runtimes. Traditional solutions are often limited and not architecturally designed to run on premises, instead suited for workloads in scalable container orchestration platforms. In this way, the flexibility of a CFIV framework provides a universal solution for the complex challenge of test engineering within distributed computing systems of all kinds.

Various aspects of the disclosure will be described with regard to certain examples and embodiments, which are intended to illustrate but not limit the disclosure. Although aspects of some embodiments described in the disclosure will focus, for the purpose of illustration, on particular examples of on-demand functions, data block device functions, and on-demand code execution system configurations, the examples are illustrative only and are not intended to be limiting. In some embodiments, the techniques described herein may be applied to additional or alternative types of on-demand functions, data block device functions, and on-demand code execution system configurations. Additionally, any feature used in any embodiment described herein may be used in any combination with any other feature or in any other embodiment, without limitation.

Example Network Environment

FIG. 1 depicts an illustrative computing environment 100 in which embodiments of the present disclosure can be implemented by a CFIV framework to test the availability and resiliency of a distributed system. At the highest level, the computing environment 100 may include client devices 102 that connect to a fault injection and validation system 110 over a network 104. The fault injection and validation system 110 is part of the overall CFIV framework and may comprise a fault injection and validation database 112 (also referred to throughout this disclosure simply as the "database 112") to store data related to the CFIV framework and fault injection and a validation server 114 (also referred to throughout this disclosure simply as the "server 114") to execute the tasks of the CFIV framework. The client devices 102 may also connect to the target services 120 over the network 104. Within some or all target services 120 resides an agent 122 of the CFIV framework comprising code to execute failure injections and validations.

In some embodiments, the fault injection and validation system 110 may be a part of a cloud provider network (e.g., a "cloud"), which may correspond to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to provide various services, such as the fault injection and validation techniques of the present disclosure. The computing services provided by the cloud that may include the fault injection and validation system 110 can thus be considered as both the applications delivered as services over a publicly accessible network (e.g., the Internet, a cellular communication network) and the hardware and software in cloud provider data centers that provide those services. The fault injection and validation system 110 may implement various computing resources or services, which may include performing techniques described in the present disclosure, a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

Additionally, the client devices 102 may communicate with the fault injection and validation system 110 via various interfaces (e.g., APIs). In some embodiments, the fault injection and validation system 110 may interact with the client devices 102 through one or more user interfaces, command-line interfaces, APIs, or other programmatic interfaces for requesting actions or services. For example, the fault injection and validation system 110 may transmit the results of a failure injection and corresponding validations through the network 104 to the client devices 102.

Various example client devices 102 are shown in FIG. 1, including a desktop computer, laptop, and a mobile phone, each provided by way of illustration. In general, the client devices 102 can be any computing device such as a desktop, laptop or tablet computer, personal computer, wearable computer, server, personal digital assistant ("PDA"), hybrid PDA/mobile phone, mobile phone, electronic book reader, set top box, voice command device, camera, digital media player, and the like. In some embodiments, a user of a client device 102 may provide customized input for failure injection requests and validation configurations to the fault injection and validation system 110 through the network 104.

Alternatively, in some embodiments, fault injections and validations run within the CFIV framework may be set with a scheduler of the fault injection and validation server 114 and implemented by the fault injection and validation system 110 (as opposed to running upon an ad hoc request from a client device 102). In these embodiments, fault and validation data may be obtained by the fault injection and validation server 114 and stored in the fault injection and validation system database 112 for execution by a call to an agent 122 in a target service 120.

In some embodiments, the network 104 includes any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing environment 100 may also comprise target services 120 of a distributed system. In some embodiments of a distributed system, target services 120 provide on-demand, scalable computing services to users through the network 104 (e.g., allowing users to have at their disposal scalable "virtual computing devices" via their use of the block storage servers, object storage servers, and compute servers). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients. Target services 120 may serve any number of purposes in connection with client devices 102 in a distributed system, but regardless of their particular implementation, all target services 120 run on computing resources that are subject to unexpected error and failure, and thus the performance of target services 120 in various failure scenarios is the focus of the testing provided by a CFIV framework.

In order to implement the functionality of the CFIV framework, an agent 122 is located within individual target services 120 that may receive a failure injection. The agent

122 serves as the presence of the CFIV framework within the target service 120. The agent 122 may contain code that is run as soon as the agent 122 receives a request from the fault injection and validation server 114 to create a failure scenario. The agent 122 can be generic in nature and can be installed on any stateless or stateful distributed system. In some embodiments, the agent 122 is a Java-based service which may be installed on virtual machines and container runtimes.

The agent 122 receives a call from a fault injection and validation server 114 within the fault injection and validation system 110 in order to initiate its functionality. In some embodiments, the fault injection and validation server 114 is a Java-based (e.g., Coral) REST service, using APIs with access to the target services 120 where failures may be injected. Client devices 102 may send requests through an API to the fault injection and validation server 114 to inject failures. In other examples, fault injections and the corresponding validations can be placed on a scheduler. For example, a fault injection scheduler may run a particular failure injection and its validations every day for 2 hours. In such an example, an API call will be made to the fault injection and validation server 114 in order to set up the failure injection schedule. Once a failure injection has been set by a scheduler or requested with an API call by a client device 102, the fault injection and validation server 114 may then internally call APIs to create a failure configuration file and store metadata about the failure injection and validation scenarios related to the failure in the fault injection and validation system database 112.

The fault injection and validation system database 112 may implemented as a NoSQL datastore comprising an "events table" (or tables) to store the status of failure injection and validation events. The database 112 may also include a table or tables to store metadata, such as the metadata related to a validation. For example, a validation may be run by the server 114 in the database 112 in order to validate the metadata associated with or resulting from a failure injection. The database 112 can be a storage solution implemented in object storage servers, and the database 112 may be a relational database. The fault injection and validation system 110 discussed above, along with its database 112 and server 114, may be implemented by one or more computing devices in order to provide the functionality of the CFIV framework for a distributed system. Notably, the computing environment 100 depicted in FIG. 1 may serve as a mirror pre-production staging environment for a production environment with the same components. In this way, behavior of the system can be tested before actually impacting the live production environment.

Implementation of a CFIV Framework

Figure 2:
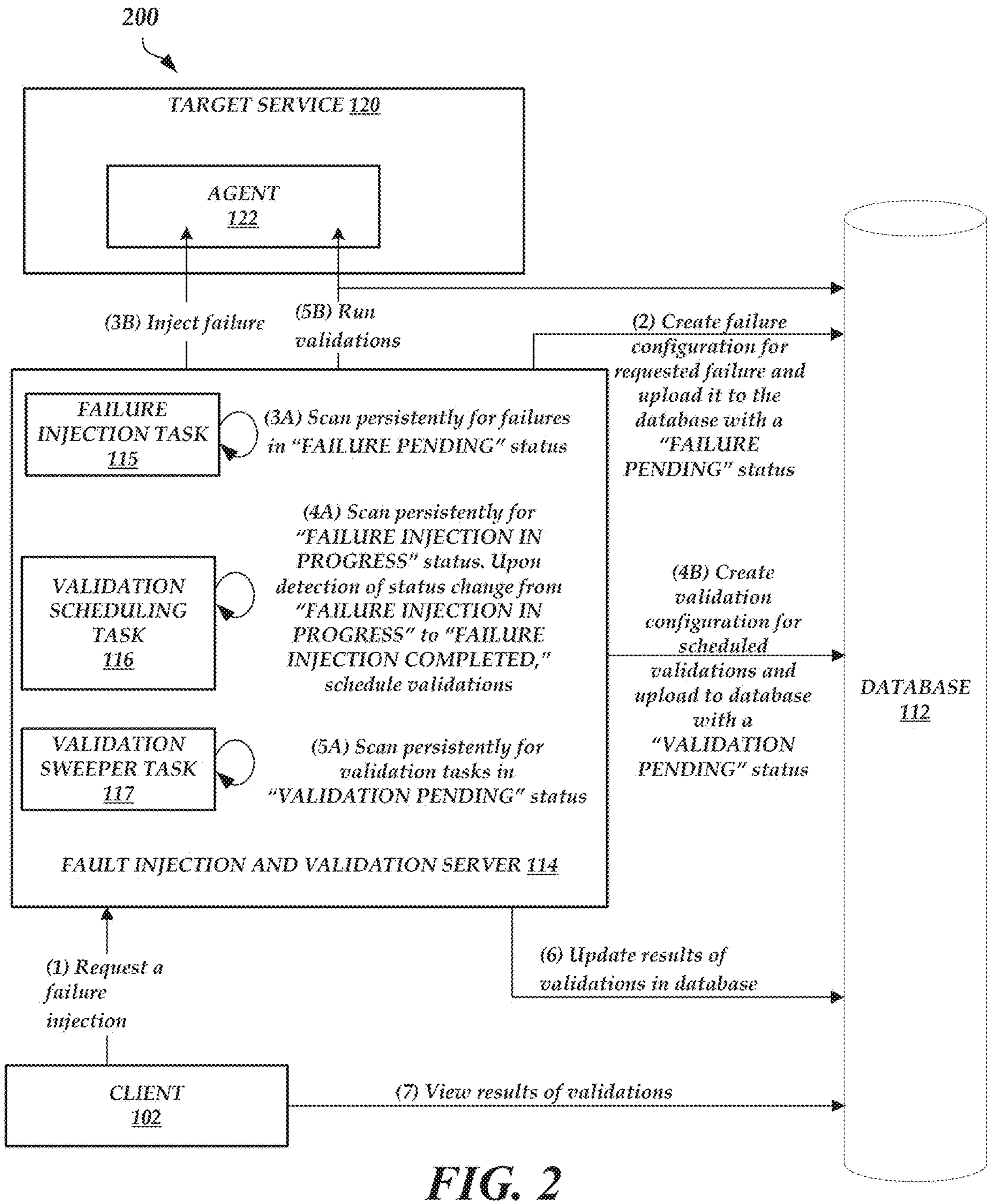
FIG. 2 depicts an illustrative block diagram of the interaction between components of the controlled fault injection and validation framework of FIG. 1 to test the availability and resiliency of a distributed system according to some embodiments.

FIG. 2 depicts an illustrative block diagram 200 of the interactions (between components of the computing environment 100 described above in FIG. 1) involved in testing the availability and resiliency of a distributed system with a CFIV framework. The block diagram 200 of FIG. 2 includes numbered operations that outline a high level flow of the interactions in a CFIV framework when a failure is injected. Operation (1) of diagram 200 begins when a client device 102 sends a request for a failure injection to the fault injection and validation server 114. At operation (2), in response to the request of the client 102, the fault injection and validation server 114 creates a failure configuration file for the requested failure according to the input provided by the client device 102. In some examples, a failure configuration file may include the name or other identifier of the failure requested, the classification of the severity of the failure requested (e.g., high, medium, low, etc.), the duration of the failure requested (e.g., how many minutes or hours to allow the failure injection to run), the environment type for the failure injection (e.g., a storage node), and/or the percentage of the system in a given zone of availability that should be affected by a failure injection (such a value may be generated randomly by the algorithm as desired). In other examples, failure configuration files may include any relevant information necessary to inject the requested failure.

After generating the failure configuration, the server 114 uploads the failure configuration file to the database 112 along with submitting a "Failure Pending" status for the failure into the events table of the database 112. The details regarding statuses in the events table of the database 112 are discussed in more detail in connection with FIG. 3 of this disclosure. In short, the status of a failure or validation stored in the database 112 allows the CFIV framework to keep track of the progress of a given event within the CFIV framework. With respect to operation (2) of FIG. 2, a "Failure Pending" status signals to the CFIV framework that a failure has been requested, configured, and is waiting to be run.

As is depicted in FIG. 2, the fault injection and validation server 114 may comprise sub-components. These sub-components may be asynchronous worker threads continuously or periodically running in the server 114. In some embodiments, one such worker thread is the failure injection task 115. At operation (3A), the failure injection task 115 of the server 114 periodically or persistently scans the database 112 for failures with a "Failure Pending" status (e.g., the status that was set in the previous operation to indicate that the failure was prepared to run). Upon detection of an eligible failure with a "Failure Pending" status, the failure injection task 115 submits the failure for injection by the server 114. Thus, at operation (3B) the server 114 injects the requested failure into the agent 122 of the target service 120 being tested by the particular failure injection. To inject a failure, the server 114 calls the agent 122 with an API to run an algorithm embedded in the agent 122 for injecting the failure. In some embodiments, a separate algorithm may be tied to each failure injection in the agent 122 (namely, there is a 1:1 mapping of failure name to algorithm within an agent 122). Upon receiving the request from the server 114 to inject the failure, the agent 122 fetches the appropriate algorithm from the internal mapping and injects the failure into its host target service 120. At this point, the status of the failure in the events table changes to "Failure Injection in Progress." In some embodiments, failures may be injected and executed concurrently. For example, a network latency failure may be injected and executed concurrently with a CPU failure. Additionally, in some embodiments, failures may be injected and executed in a chain (e.g., one failure at a time executing upon completion of the preceding failure injection).

At operation (4A) of FIG. 2, another asynchronous worker thread running on the server 114 is running periodically or persistently: the validation scheduling task 116. The validation scheduling task 116 scans the database 112 for failures with a "Failure Injection in Progress" status. During operation (4*a*) the validation scheduling task 116 keeps track of failures in progress, and upon detecting that a failure injection in progress has been successfully completed (signaled by a status change from "Failure Injection in Progress" to "Failure Injection Completed" in the database 112), the validation scheduling task 114 schedules the validations corresponding to the successfully completed failure. Next, at operation (4B), the server 114 creates a validation configuration file for the validations scheduled by the validation scheduling task 116. In some examples, a validation configuration file may include information, such as an identifier for the associated failure injection, the time the failure was created or updated, version identifiers for the validation record, the status of the validation (e.g., "Validation Failed"), or the type of the validation (e.g., validate metadata in the database). This validation configuration file can be optionally customized by user input via a client device 102. The CFIV framework comprises a 1: N mapping of failures to validations in the database 112 so that after a failure injection is complete, validations corresponding to that failure may execute in a sequential or parallel fashion to validate state of the systems affected by the failure injection. In some embodiments, the CFIV framework supports a 1: N mapping of validations to failures in the database 112, allowing for multiple failures to map to a single validation. Validations may verify behavior of the distributed system through key performance and correctness metrics (e.g., using the agent 122), the metadata of the distributed system in the database 112, or any custom validation requested by a user through input to a client device 102, among other examples. Validations are background jobs stored in the code deployed to the agent 122 by the server 114. In this way, assumptions regarding how a distributed system may perform during a failure event may be automatically validated after the injection of the failure, allowing for hands-free accuracy and efficiency within the CFIV framework. As operation (4B) concludes, upon creation of the validation configuration, the server 114 uploads the validation configuration to the database 112 with a "Validation Pending" status.

Moving next to operation (5A), another asynchronous worker thread running periodically or persistently on the server 114 called the validation sweeper task 117 scans the database 112. Specifically, the validation sweeper task 117 scans for validations in "Validation Pending" status, a status that serves like a queue for validations that have been scheduled in the previous operation and are now waiting to run. When the validation sweeper task 117 identifies pending validations to the server 114, the server 114 then moves to operation (5B), calling relevant APIs to run the validations in the agent 122 and/or in the database 112. For validations run in the agent 122, the agent 122 runs its code for the validations at hand and validates metrics and other information relevant to the distributed system's performance during the failure injection of the previous operations. Similarly, validations run in the database 112 may include validations of metadata involved with the failure injection and resulting behavior of the distributed system. Upon gathering this information and completing the validations, at operation (6), the server 114 updates the results of the validations in the database 112. Afterwards, the client devices 102 may make a call to the database 112 at operation (7) to view the results of the validations of the failure injection, thus gaining insight into the performance of the distributed system.

Figure 3:
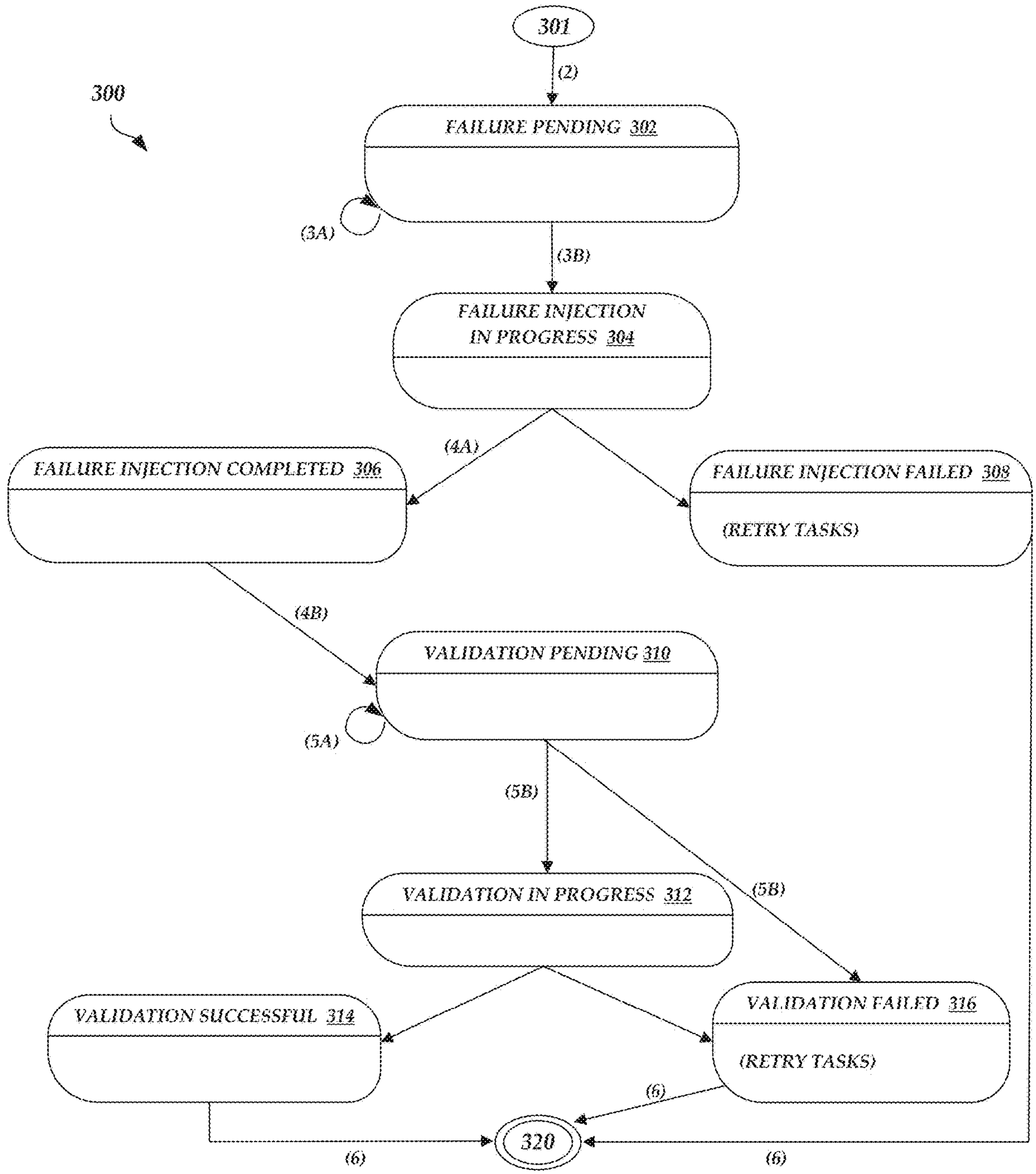
FIG. 3 depicts an illustrative state diagram providing examples of the various states that may exist in the database of the controlled fault injection and validation framework of FIG. 1, as well as providing transitions between those states with reference to the numbered operations of FIG. 2, according to some embodiments.

FIG. 3 depicts an illustrative state diagram 300 providing examples of the various states of validation and failure events that may exist in the database 112 of the CFIV framework of FIG. 1. FIG. 3 also provides transitions between the relevant states with reference to the numbered operations of FIG. 2. FIG. 3 may represent the states of events in an events table of the database 112 storing information for failure injections and validations. The state diagram 300 begins at the starting point 301 as operation (2) of FIG. 2 is underway. More specifically, after a failure configuration file is created for a requested failure, the failure configuration file is uploaded to the database 112, triggering the first failure status to be simultaneously logged for the failure: "Failure Pending" status 302. In some embodiments, the server 114 may include a Failure Scheduling Task (not pictured) that schedules failures in "Failure Pending" status 302 according to failure specifications.

Next, as operation (3A) unfolds (as depicted in FIG. 3 with the arrow looping on the "Failure Pending" status 302), the failure injection task 115 periodically or persistently scans for any failure in the database 112 with a "Failure Pending" status 302. Upon detection of such a failure, the state diagram 300 transitions with operation (3B) as the failure is injected by the agent 122 to the target service 120. Upon injection of the failure at the transition of operation (3B), the state of the failure is changed to "Failure Injection in Progress" status 304. If the failure injection fails for any reason and cannot be completed successfully, the status of the failure is changed to "Failure Injection Failed" status 308. In some examples, the "Failure Injection Failed" status 308 triggers logic in the agent 122 to retry the failure injection in the target service 120. If retrying the failure injection is unsuccessful once again, the failure injection may conclude in some embodiments, transitioning to the end state 320 with operation (6) in which the relevant data about the unsuccessful injection is logged in the database 112 for client devices to view.

If instead the failure injection is successful, then the state changes from "Failure Injection in Progress" status 304 to "Failure Injection Completed" status 306 during the transition of operation (4A). As previously discussed, the validation scheduling task 116 schedules validations upon detecting a state change during its persistent scan from "Failure Injection in Progress" status 304 to "Failure Injection Completed" status 306. In this way, the CFIV framework automates validations after failure injection, seamlessly flowing into the validations of a failure injection after the failure injection is successful.

Next, operation (4B) transitions the state diagram from "Failure Injection Completed" status 306 to "Validations Pending" status 310 for successful failure injections. As previously discussed, the transition of operation (4B) includes creating a validation configuration file for scheduled validations and uploading the configuration file to the database 112. Along with the upload of the validation configuration file, the server 114 also changes the state of the validation event in the events table of the database 112 to "Validation Pending" status 310. In this way, the CFIV framework uses the status of the validation to serve as a marker that the validation is in the queue and ready to be run. Thus, during operation (5A) which loops on the "Validations Pending" status 310 of FIG. 3, the validation sweeper task 117 periodically or persistently checks for validations queued up and ready to run. Upon detection of a pending validation by the validation sweeper task 117, the state diagram 300 transitions once again amidst operation (5B), which branches depending on if the validation runs to completion. In the case of some sort of error in the execution of the validation by the agent 122 in the target service 120, the state diagram 300 shifts to the "Validation Failed" status 316. In such a case in some examples, the agent 122 may retry the validation task once more before reporting the data of the unsuccessful or otherwise incomplete execution of the validation task to the database 112 as described in operation (6) and concluding at the end state 320. However, if instead the validation task does not encounter an error while being executed, then the state of the validation shifts during operation (5B) from "Validation Pending" status 310 to "Validation in Progress" status 312. A validation may still encounter an error after shifting state to "Validation in Progress" status 312, and thus, the aforementioned "Validation Failed" status 316 may still occur at this point. However, if the validation in progress is successfully run by the agent 122 in the target service 120, the state changes from "Validation in Progress" status 312 to "Validation Successful" status 314. Like the other paths, the successful execution of this validation transitions to the end state 320 after logging the results of the validation in the database 112 as detailed in operation (6).

Figure 4A:
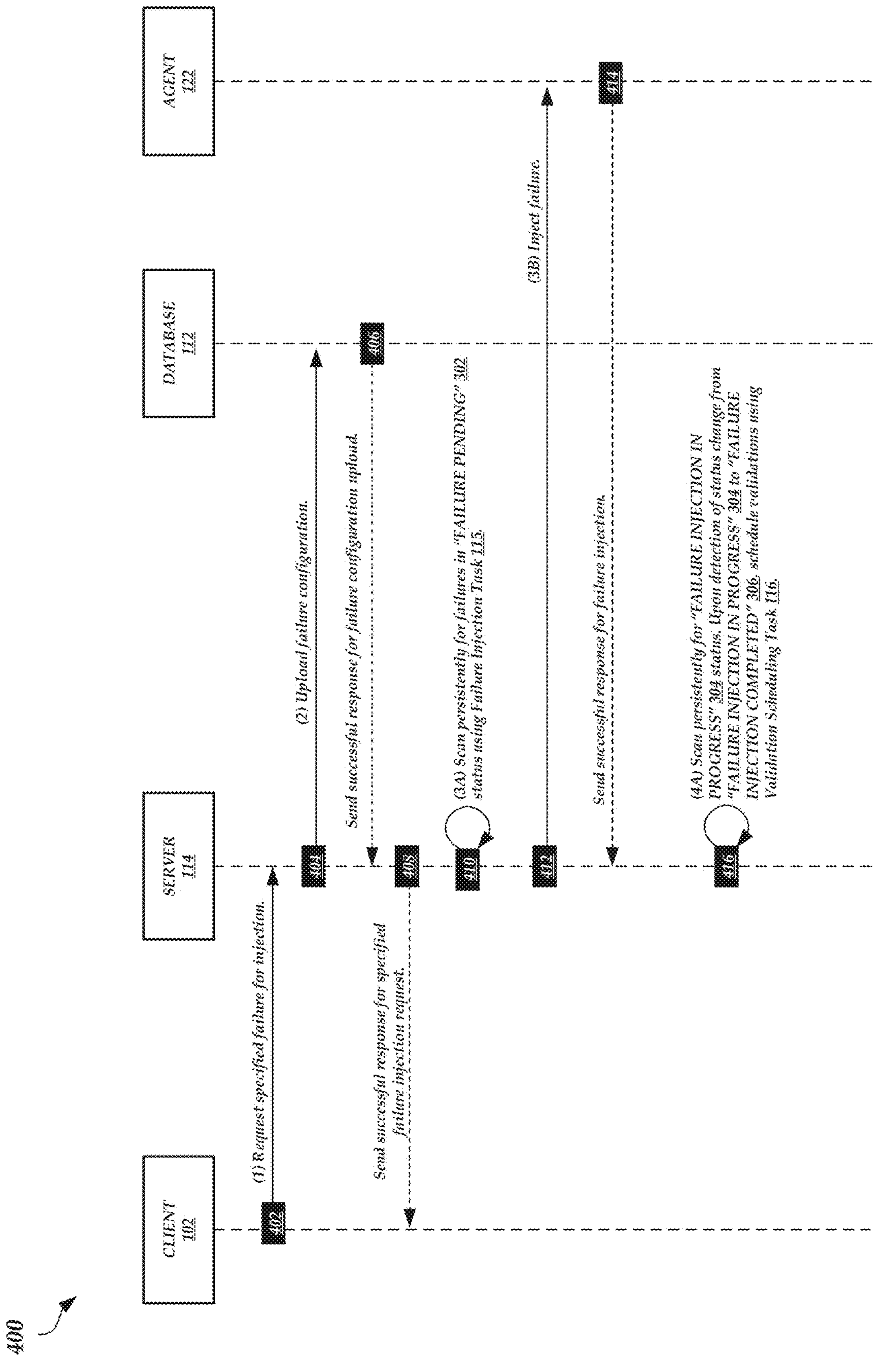
FIG. 4A is an illustrative diagram of interactions between the client, server, database, and agent of FIG. 1 to inject a failure into a distributed system according to some embodiments.

Turning now to FIG. 4A, an illustrative diagram 400 depicts interactions during a failure injection between the client devices 102, the server 114, the database 112, and the agent 122 of FIG. 1, according to some embodiments. FIG. 4A represents an example of how the different software components of a CFIV framework may call and respond to one another in various functions. When component interactions of FIG. 4A reflect one of the operations originally described in FIG. 2, the operation number is noted within the component interaction description in order to cohere with the discussion throughout the rest of the disclosure. Similarly, when a component interaction references a state described in FIG. 3, that state is referenced coherently in accordance with the description of the state diagram 300 in FIG. 3.

The component interactions of diagram 400 begin at block 402, in which the client device 102 initiates previously described operation (1) by sending a request using the REST API of the CFIV framework for a specified failure injection to the server 114. For purposes of illustration, the interactions of FIG. 4A will be interwoven with a concrete example in which a client device 102 requests a failure called "Terminate Instance" from the server 114. This example is for illustrative purposes only, and there are many other types of failures that could be run amidst the interactions of FIG. 4A.

At block 402 as the client 102 requests the failure, the server 114 receives a corresponding failure context request providing the server with user input for the failure configuration. For example, the client device 102 may provide user input detailing specific requirements of the "Terminate Instance" failure in a failure context request such as instance identifier, failure type, failure duration, etc. Next, at block 404, the server 114 takes the details from the failure context request and creates a failure configuration file, which the server 114 then uploads to the database 112 (thus reflecting operation (2) from FIG. 2). For example, the server 114 may upload the failure configuration for the "Terminate Instance" failure to the database 112 and change its status to "Failure Pending" status 302 in the events table). In response, at block 406, the database 112 may send back a successful response to the server 114, confirming that the failure configuration was uploaded successfully. Similarly, at block 408, the server 114 sends a successful response for the specified failure injection request back to the client device 102, letting the client device 102 know that the request was received successfully within the CFIV framework.

At block 410, operation (3A) of FIG. 2 is reflected once again: the failure injection task 115 of the server 114 scans periodically or persistently for any failures in the events table of the database 112 with a "Failure Pending" status 302. When, for example, the failure injection task 115 detects the "Terminate Instance" failure with a "Failure Pending" status 302, the failure injection task 115 parses this particular failure and adds the failure as the next in line for injection by creating an "Inject Failure Request." Thus, at block 412, operation (3B) is reflected as the server 114 injects the requested failure (e.g., "Terminate Instance") into the agent 122 through an API call to the agent 122 reflecting the Inject Failure Request from the previous operation. In this particular example, the agent 122 would have a "Terminate Instance" algorithm within its code that takes input from the Inject Failure Request and injects the failure in the target service 120 (in this case, the instances being terminated). Thus, the instances requested by the client device 102 would go into a failure state in order to simulate the environment's performance during a true instance outage of the same nature. At block 414, the agent 122 sends back a successful response to the server 114 upon successfully injecting the failure into the target service 120. Note that in an alternate embodiment (not pictured in FIG. 4A), if the server 114 had not received a successful response back from the agent 122 and had instead received an unsuccessful response, this would trigger the "Failure Injection Failed" status 308 described in FIG. 3, triggering a retry of the failure injection.

Turning finally to block 416 of FIG. 4A, the validation scheduling task 116 of the server 114 scans periodically or persistently for failures with a "Failure Injection in Progress" status 304, as described throughout this disclosure in connection with operation (4A). Upon detection of a status change from "Failure Injection in Progress" status 304 to "Failure Injection Completed" status 306, the validation scheduling task 116 schedules the validations mapped to the failure that was just injected. For example, the "Terminate Instance" failure may have three corresponding mapped validations. In this case, the validation scheduling task 116 would detect when the "Terminate Instance" failure shifts to a "Failure Injection Completed" status 306, reference the mapping for that failure to find the three corresponding validations that the validation scheduling task 116 needs to schedule, and then schedule these three validations.

Figure 4B:
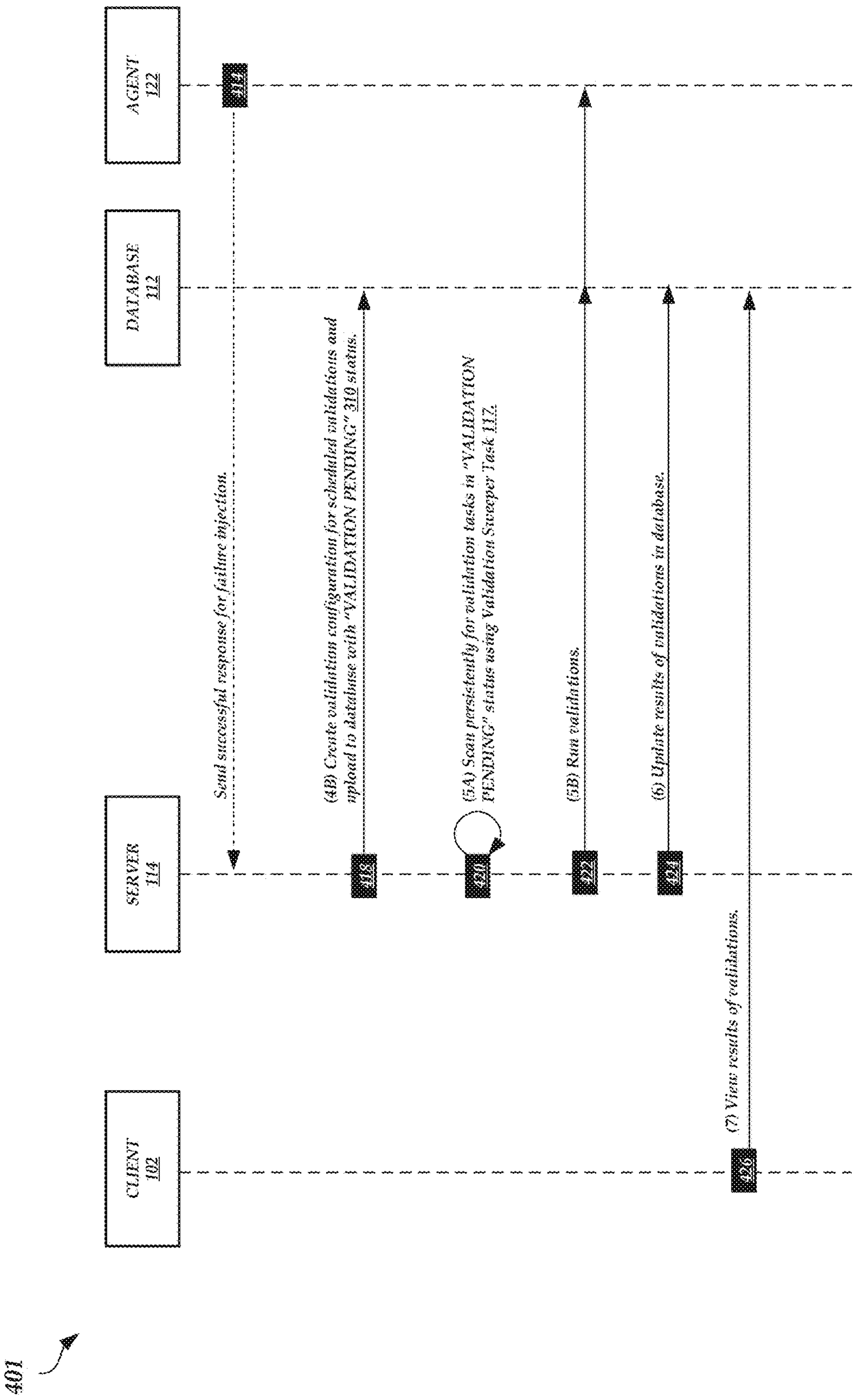
FIG. 4B is an illustrative diagram of interactions between the client, server, database, and agent of FIG. 1 to run validations in a distributed system in response to a completed failure injection according to some embodiments.

FIG. 4B is a continuation of FIG. 4A and operates in the same manner as an illustrative diagram 401 depicting interactions during a validation between the client devices 102, the server 114, the database 112, and the agent 122 of FIG. 1, according to some embodiments. Again, cross-references will be made to the operations of FIG. 2 and the states of FIG. 3, and the discussion of the "Terminate Instance" failure example will continue.

The component interactions of validation interaction diagram 401 begin at block 414, which simply reiterates block 414 from FIG. 4A. Block 414 is included again in FIG. 4B to highlight the fact that the validation process begins immediately upon the server 114 receiving a successful response from the agent 122 for a failure injection. Assuming block 416 from FIG. 4A has now also concluded with three successfully scheduled validations for the "Terminate Instance" failure, FIG. 4B now moves to block 418. At block 418, the server 114 carries out operation (4B) by creating a validation configuration file for the scheduled validations and uploading the validation configuration to the database 112. Upon upload of the validation configuration file at this operation, the server 114 also updates the status of these validations to "Validation Pending" status 310 (e.g., the three validation tasks mapped to the "Terminate Instance" failure would now have a "Validation Pending" status 310 in the events table of the database 112).

Next, at block 420, the validation sweeper task 117 of the server 114 scans periodically or persistently for any validations in the events table of the database 112 with a "Validation Pending" status 310, as described in operation (5A).

In this particular example, the validation sweeper task 117 would find three validation tasks tied to the "Terminate Instance" failure with a "Validation Pending" status 310, thus queuing them as the next validations to be run by the server 114. Accordingly, at block 422, operation (5B) unfolds as the server 114 runs the validations identified by the validation sweeper task 117. To do this, the server 114 updates the status of the validations to "Validation in Progress" status 312 and makes an API call to the agent 122, which has the code for each validation stored within. The agent 122 then runs the validations to verify the state of its target service 120 in the context of the failure that the agent 122 just injected: verifying metadata, metrics, or database availability, among other possible factors. In the context of verifying metadata, the agent 122 certifies the availability and durability of the components—this may mean pulling metadata for a segment, cluster, or protection group of the target service 120. In the context of verifying metrics, the agent 122 may pull metrics (e.g., Cloudwatch metrics or other similar metrics) regarding health and performance of the distributed system as well as usage patterns and alarms. When the agent 122 runs validations tied to database availability, the agent 122 makes sure that read and write instructions happen as expected during the simulated failure. Upon receiving a successful response from the agent 122 that the validation is complete, the server 114 updates the status of the validation to "Validation Successful" status 314. So in the example at hand, the agent 122 would have successfully run the three validations tied to the "Terminate Instance" failure and then updated each of their statuses to "Validation Successful" status 314 in the events table of the database 112.

At block 424 of FIG. 4B, the server 114 updates the database 112 with the results that came back from the validation queries run in the previous operation. So for example, if all three validations of the "Terminate Instance" failure successfully confirmed that the distributed system operated as expected, the server 114 would record each completed validation along with its positive outcome in the events table of the database 112. Thus, block 424 reflects operation (6) of FIG. 2. Finally at block 426, the validation component diagram 401 concludes as a client device 102 makes a call to the database 112 to view the results of the validations run for this failure injection, as described in operation (7) of FIG. 2. For example, the user who requested the "Terminate Instance" failure injection may now be curious how the distributed system performed under an outage of these particular instances, and upon viewing the results in the database, the user would be able to feel confident that the distributed system was indeed prepared for an outage of this type. Thus, this outcome can be incorporated into the next set of tests or experiments run within the CFIV framework.

Figure 5:
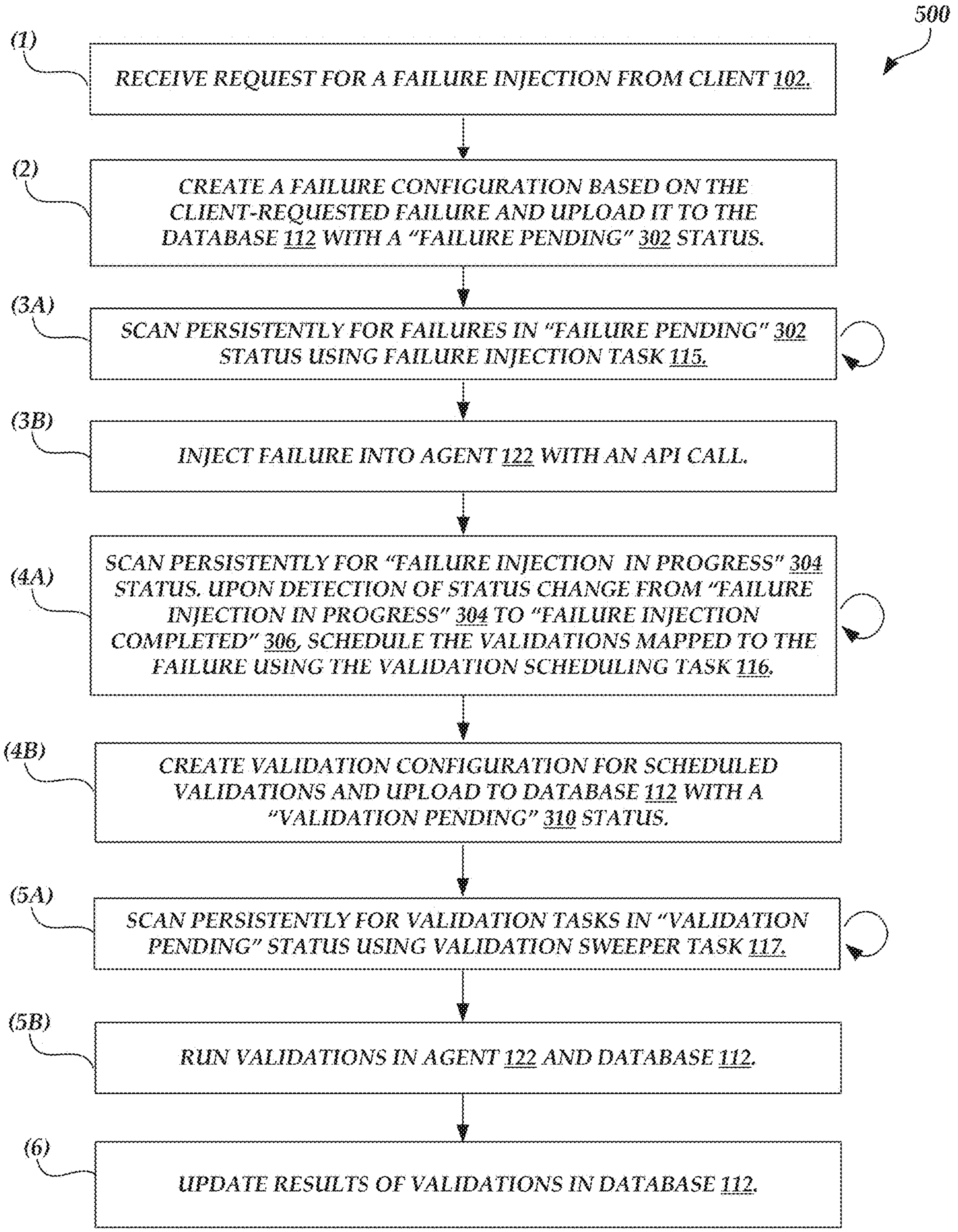
FIG. 5 is a flow diagram of an illustrative routine for testing the availability and resiliency of a distributed system using a controlled fault injection and validation framework according to some embodiments.

FIG. 5 is a flow diagram of an illustrative routine 500 for testing the availability and resiliency of a distributed system using a server 114, a database 112, and an agent 122 of a CFIV framework according to some embodiments. Specifically, FIG. 5 provides a visual flow of the operations described in FIG. 2 and throughout this disclosure in order with further detail. Routine 500 begins at operation (1), in which the server 114 receives a request for a failure injection from a client device 102.

In alternative embodiments, operation (1) of routine 500 may not include a specific request from a client device 102, but rather a pre-planned experiment that has been set by a Failure Scheduling Task of the server 114 (not pictured). In this way, the CFIV framework not only fields ad hoc failure requests from client devices 102, but the CFIV framework can also conduct regularly scheduled stress tests, outages, and randomized experiments. For example, there may be a failure that is scheduled (using a persistent or periodic Failure Scheduling Task of the server 114) to run in the distributed system every day as a safeguard to make sure the system is in working order after each code deployment. Advantageously, this hands-off approach highlights the technical improvements over previous manual approaches to stress testing a distributed system, because the Failure Scheduling Task can make use of randomization algorithms create a new (and fully random) experiment every day. Over time, the effect of this randomization means that a breadth of failure scenarios gets captured by the CFIV framework that would never get captured if all experiments were manually designed. For example, in a distributed system implemented in a cloud provider network with availability zones across different geographies, the randomization algorithm may take into account all the instances present in a given availability zone and create a random percentage value (e.g., 23% of instances), and then create latency in or shut down 23% of instances in that availability zone accordingly. During the same time, the randomization algorithm may, for sake of illustration, also inject service level faults into the system, thus creating timeout errors in all service APIs related to compute instances. In some examples of latency simulations across availability zones of resources, restarts may be even simulated at the database engine level. In short, during the failure injection, the failure scheduling task accesses randomized values that continuously change to simulate the real-life randomness present in data centers experiencing service outages or latency with a regional endpoint or unexpected natural disasters such as fires.

Turning back to routine 500 at operation (2), the server 114 creates a failure configuration file based on the client-requested failure (or alternatively, the periodically scheduled failure of the Failure Scheduling Task) from operation (1) and uploads the failure configuration to the events table of the database 112. During operation (2), the server 114 also updates the state for this failure to "Failure Pending" status 302 in the database 112.

At operation (3A) of routine 500, the failure injection task 115 of the server 114 scans periodically or persistently (depicted using a looping arrow) in the background for any tasks in the events table of the database 112 that currently have a "Failure Pending" status 302. Upon detection of such a failure, the failure injection task 115 submits the detected failure to the server 114, which proceeds to operation (3B). At operation (3B), the server 114 injects the identified failure into the agent 122 by making a REST API call to that agent 122 that details the failure configuration information required for that failure injection. Thus at operation (3B), the agent 122 injects the requested failure (which is stored in the agent 122) into the target service 120 that the agent 122 resides on, and the status of the failure is updated to "Failure Injection in Progress" status 304 by the server 114.

At operation 4A of routine 500, the validation scheduling task 116 of the server 114 periodically or persistently scans (depicted using a looping arrow) for any failures in the events table of the database 112 that currently have a "Failure Injection in Progress" status 304. The validation scheduling task 116 keeps watch on all in progress failures in order to detect the moment that any of them switch to a "Failure Injection Completed" status 306. At this moment, the validation scheduling task 116 schedules any validations mapped to the failure just successfully injected. Operation (4A) represents a technical improvement over previous approaches to failure injection and validation, which would have required hands on planning and manual configuration of validation after a failure is identified as injected successfully. However, with a CFIV framework, the shift from failure injection to validation scheduling is seamless and not likely to contain human error because the shift is built into the CFIV framework beforehand and runs automatically.

Next at operation (4B) of routine 500, the server 114 creates a validation configuration for the scheduled validations from operation (4A) and uploads the validation configuration to the events table of the database 112 for use during the validation process. Also during operation (4B), the server 114 updates the status of these validations in the events table of the database 112 to "Validation Pending" status 310. Thus, the validations are ready to be detected in the next operation, operation (5A) of routine 500, in which the validation sweeper task 117 runs as an asynchronous worker thread in the background of the server 114, periodically or persistently fetching validation tasks with a "Validation Pending" status 310. Once identified, the validation sweeper task 117 submits these validations to the server 114. At operation (5B), the server 114 runs each identified validation by making a REST API call to the agent 122 in order to activate the agent 122 to implement the mapped validations, running them in its host target service 120. In this way, validation tasks get scheduled and run almost instantaneously in some embodiments after the failure injection task is completed, another technical improvement over past manual techniques. Finally, the routine 500 concludes at operation (6) when the server 114 updates the results of the validations just run in operation (5B) in the database 112 so that the client devices 102 can access the results of the failure injection or experiment in the database 112.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, operations, and algorithm steps described in connection with the embodiments disclosed herein can be implemented as electronic hardware, or combinations of electronic hardware and computer software. To clearly illustrate this interchangeability, various illustrative components, blocks, modules, operations, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for injecting controlled failures and validations into a distributed computing system, the system comprising:

one or more processors; and a memory that stores computer-executable instructions, wherein the computer-executable instructions, when executed by the one or more processors, cause the one or more processors to:

receive a failure injection request, wherein the failure injection request identifies a first failure to test in the distributed computing system;

generate a failure configuration file for the first failure based at least partly on the failure injection request;

upon detecting the failure configuration file, inject the first failure into a target service of the distributed computing system using an agent, wherein the agent comprises first executable instructions related to the first failure;

upon detecting that injection of the first failure is complete, create a validation configuration file for the first failure, wherein the first failure corresponds to a validation;

upon detecting the validation configuration file, run the validation in the target service of the distributed computing system using the agent, wherein the agent comprises second executable instructions related to the validation; and upon receiving a reporting request from a user device, transmit resulting data of the validation and the first failure to the user device.

2. The system of claim 1, wherein the first failure corresponds to a plurality of validations, and wherein the plurality of validations is included in the validation configuration file.

3. The system of claim 1, wherein the failure configuration file maintains a pending status until the first failure is injected, and wherein the failure configuration file is detected by the pending status.

4. The system of claim 1, wherein a client device calls a Representational State Transfer (REST) Application Programming Interface (API) to send the failure injection request.

5. The system of claim 1, wherein the system for injecting controlled failures and validations is implemented a Java-based service, and wherein the Java-based service is installed on a virtual machine or a container runtime.

6. A computer-implemented method comprising:

receiving a failure injection request, wherein the failure injection request identifies a first failure to test in a distributed computing system;

generating a failure configuration file for the first failure based at least partly on the failure injection request;

injecting the first failure into a target service of the distributed computing system using an agent, wherein the agent comprises first executable instructions related to the first failure;

upon detecting that injection of the first failure is complete, creating a validation configuration file for the first failure, wherein the first failure corresponds to a validation;

running the validation in the target service of the distributed computing system using the agent, wherein the agent comprises second executable instructions related to the validation; and upon receiving a reporting request from a user device, transmitting resulting data to the user device.

7. The computer-implemented method of claim 6, wherein the validation maps to a plurality of failures.

8. The computer-implemented method of claim 6, wherein the agent is installed on a stateless distributed system.

9. The computer-implemented method of claim 6, wherein the agent is installed on a stateful distributed system.

10. The computer-implemented method of claim 6, wherein a client device calls a Representational State Transfer (REST) Application Programming Interface (API) to send the failure injection request.

11. The computer-implemented method of claim 10, wherein the client device requests a custom validation for the first failure.

12. The computer-implemented method of claim 6, wherein the validation corresponding to the first failure executes immediately following completion of the injection of the first failure.

13. The computer-implemented method of claim 6, wherein the first failure is a fire event, a service outage, or a latency event.

14. One or more non-transitory computer-readable media comprising computer-executable instructions for injecting controlled failures and validations into a distributed computing system, wherein the computer-executable instructions, when executed by a computer system, cause the computer system to:

receive a failure injection request, wherein the failure injection request identifies a first failure to test in the distributed computing system;

generate a failure configuration file for the first failure based at least partly on the failure injection request;

inject the first failure into a target service of the distributed computing system using an agent, wherein the agent comprises first executable instructions related to the first failure;

in response to completion of injection of the first failure, execute a validation corresponding to the first failure in the target service of the distributed computing system using the agent, wherein the agent comprises second executable instructions related to the validation; and transmit resulting data to a user device.

15. The one or more non-transitory computer-readable media of claim 14, wherein the first failure executes concurrently with a plurality of failures.

16. The one or more non-transitory computer-readable media of claim 14, wherein the agent is installed on a stateless distributed system.

17. The one or more non-transitory computer-readable media of claim 14, wherein the agent is installed on a stateful distributed system.

18. The one or more non-transitory computer-readable media of claim 14, wherein a client device calls a Representational State Transfer (REST) Application Programming Interface (API) to send the failure injection request.

19. The one or more non-transitory computer-readable media of claim 14, wherein the validation corresponding to the first failure executes immediately following the completion of the injection of the first failure.

20. The one or more non-transitory computer-readable media of claim 14, wherein the first failure is a fire event, a service outage, or a latency event.

* * * * *